United States Patent
Barker

(10) Patent No.: US 6,174,347 B1
(45) Date of Patent: Jan. 16, 2001

(54) BASIC TUNDISH FLUX COMPOSITION FOR STEELMAKING PROCESSES

(75) Inventor: Bruce J. Barker, Cleveland, OH (US)

(73) Assignee: Performix Technologies, Ltd., Warren, OH (US)

(*) Notice: Under 35 U.S.C. 154(b), the term of this patent shall be extended for 0 days.

(21) Appl. No.: 09/388,789

(22) Filed: Sep. 2, 1999

Related U.S. Application Data

(62) Division of application No. 08/763,359, filed on Dec. 11, 1996.

(51) Int. Cl.⁷ ................................................ C21C 7/076
(52) U.S. Cl. ................................. 75/560; 75/561; 75/570
(58) Field of Search ......................... 75/560, 561, 570, 75/305

(56) References Cited

U.S. PATENT DOCUMENTS

| | | | |
|---|---|---|---|
| 933,357 | 9/1909 | Baraduc-Muller | 75/303 |
| 1,335,370 | 3/1920 | Ellis | 75/303 |
| 1,459,712 | 6/1923 | Bauret | 75/303 |
| 2,079,901 | 5/1937 | Davidson | 75/303 |
| 2,237,485 | 4/1941 | Hardt | 75/303 |
| 2,276,671 | 3/1942 | Rentachler et al. | 75/303 |
| 2,361,416 | 10/1944 | Reece | 75/43 |
| 2,993,761 | 7/1961 | Erasmus | 23/208 |
| 3,027,227 | 3/1962 | Coxey | 75/130 |
| 3,197,306 | 7/1965 | Osborn et al. | 75/130 |
| 3,314,782 | 4/1967 | Arnaud | 75/57 |
| 3,320,052 | 5/1967 | Bowden | 75/53 |
| 3,410,681 | 11/1968 | Orban | 75/94 |
| 3,459,540 | 8/1969 | Tisdale et al. | 75/129 |
| 3,507,642 | 4/1970 | Shaw | 75/52 |
| 3,585,025 | 6/1971 | Obst et al. | 75/54 |
| 3,607,234 | 9/1971 | Kawawa et al. | 75/96 |
| 3,630,267 | 12/1971 | Hlinka et al. | 164/82 |
| 3,649,249 | 3/1972 | Halley et al. | 75/96 |
| 3,704,744 | 12/1972 | Halley et al. | 164/82 |
| 3,725,032 | 4/1973 | Kihlstedt | 75/3 |
| 3,754,897 | 8/1973 | Derham et al. | 75/96 |
| 3,768,996 | 10/1973 | Metz | 75/10 R |
| 3,788,840 | 1/1974 | Koenig et al. | 75/94 |
| 3,861,906 | 1/1975 | Tipnis et al. | 75/124 |
| 3,897,244 | 7/1975 | Murton | 75/53 |
| 3,899,324 | 8/1975 | Corbett | 75/94 |
| 3,926,246 | 12/1975 | Corbett et al. | 164/56 |
| 3,957,502 | 5/1976 | Cull et al. | 75/58 |
| 3,964,899 | 6/1976 | Jones et al. | 75/53 |
| 3,982,929 | 9/1976 | Heck et al. | 75/94 |
| 3,993,474 | 11/1976 | Roberts | 75/94 |
| 4,039,320 | 8/1977 | Uemura | 75/58 |
| 4,043,798 | 8/1977 | Nashiwa et al. | 75/53 |
| 4,050,925 | 9/1977 | Johnson | 75/30 |
| 4,060,406 | 11/1977 | Jones | 75/12 |
| 4,102,690 | 7/1978 | Koper | 106/38.28 |
| 4,105,439 | 8/1978 | Barnes | 75/51 |
| 4,126,453 | 11/1978 | Heck et al. | 75/257 |
| 4,127,407 | 11/1978 | Eitel et al. | 75/53 |
| 4,134,946 | 1/1979 | Velinger | 264/63 |
| 4,137,072 | 1/1979 | Kawakami et al. | 75/58 |
| 4,139,369 | 2/1979 | Kandler et al. | 75/58 |
| 4,142,887 | 3/1979 | Luyckx | 75/58 |
| 4,180,397 | 12/1979 | Naylor | 75/58 |
| 4,199,351 | 4/1980 | El Grammal | 75/53 |
| 4,202,692 | 5/1980 | Carini | 75/257 |
| 4,233,064 | 11/1980 | Dunn, Jr. | 75/58 |
| 4,235,632 | 11/1980 | Uher et al. | 75/257 |

(List continued on next page.)

FOREIGN PATENT DOCUMENTS

| | | | |
|---|---|---|---|
| 0 015 471 A1 | 9/1980 | (EP) | B22D/11/10 |
| 0395158 | 7/1933 | (GB) | |
| 2 265 564 | 10/1993 | (GB) | |
| 49-015128 | 4/1974 | (JP) | |
| 51-095912 | 8/1976 | (JP) | |
| 56077318 | 6/1981 | (JP) | |
| 56-108819 | 10/1981 | (JP) | |
| 60245717 | 12/1985 | (JP) | |
| 1-96322 | 4/1989 | (JP) | |
| 2-277516 | 3/1990 | (JP) | |
| 1002392 | 3/1983 | (SU) | |
| WO 91/15604 | 10/1991 | (WO) | C21C/7/076 |

OTHER PUBLICATIONS

Bigeov, V.A. et al., "Increasing the Efficiency of Ladle Desulfurization of Steel by Using Regenerated Slags." *Magnitogorsk Metallurgical Combine* Translated from Metallug. 10:9, Oct. 1987.

The Making, Shaping and Treating of Steel: Chapter 7, Slags for Nonmetallurgical Uses, pp. 333–338. *Association of Iron and Steel Engineers.* Herbick & Held, Pittsburgh, PA 1985. No Month.

The Making, Shaping and Treating of Steel: Chapter 19, Secondary Steelmaking or Ladle Metallurgy, pp. 671–690, *Association of Iron and Steel Engineers.* Herbick & Held, Pittsburgh, PA 1985. No Month.

Ladle Furnaces are Adding Value. *Iron Age*, Jan. 1990, pp. 33–39.

*Primary Examiner*—Roy V. King
*Assistant Examiner*—Tima McGuthry-Banks
(74) *Attorney, Agent, or Firm*—Renner, Kenner, Greive, Bobak, Taylor & Weber

(57) ABSTRACT

The tundish flux composition of the invention employs solid recycled ladle metallurgy furnace (LMF) slag as a fluidizing and refining base ingredient in a mixture of raw materials. The preferred recycled LMF slag material comprises about 35% to about 65% CaO, about 10% to about 35% $Al_2O_3$, about 1% to about 10% $SiO_2$, about 3% to about 15% MgO, about 0.3% to about 10% FeO, about 0.1% to about 5% MnO, about 0.1% to about 0.15% $P_2O_5$, and about 0.1% to about 0.5% S. The tundish flux composition comprises from about 10% to about 80% of recycled LMF slag with the balance being raw materials selected from a calcium oxide source, a fluorine source, a magnesium oxide source, a carbon source, a silica source, a sodium source, a potassium source, and mixtures of these raw materials.

17 Claims, No Drawings

U.S. PATENT DOCUMENTS

| | | |
|---|---|---|
| 4,248,631 | 2/1981 | More et al. .............. 75/257 |
| 4,279,643 | 7/1981 | Jackman .................. 75/58 |
| 4,280,837 | 7/1981 | Shiozaki et al. .......... 75/54 |
| 4,290,809 | 9/1981 | Loane, Jr. ............... 75/257 |
| 4,303,120 | 12/1981 | Carini ................... 164/472 |
| 4,312,400 | 1/1982 | Carini ................... 164/472 |
| 4,317,678 | 3/1982 | Faulring et al. .......... 75/58 |
| 4,318,822 | 3/1982 | Braun et al. ............. 252/189 |
| 4,338,142 | 7/1982 | Okuda et al. ............. 148/26 |
| 4,340,426 | 7/1982 | Tabei et al. ............. 75/257 |
| 4,342,590 | 8/1982 | Luyckx ................... 75/58 |
| 4,353,739 | 10/1982 | Batham et al. ........... 75/58 |
| 4,361,442 | 11/1982 | Faulring et al. .......... 75/57 |
| 4,364,771 | 12/1982 | Cordier et al. ........... 75/57 |
| 4,373,948 | 2/1983 | Faulring et al. .......... 148/2 |
| 4,373,967 | 2/1983 | Roper, Jr. et al. ........ 75/55 |
| 4,409,021 | 10/1983 | Moore ................... 75/10 R |
| 4,417,924 | 11/1983 | Schwer .................. 75/257 |
| 4,420,333 | 12/1983 | Takahashi et al. ........ 75/53 |
| 4,435,210 | 3/1984 | Hirokawa et al. ......... 75/53 |
| 4,462,834 | 7/1984 | LaBate .................. 75/257 |
| 4,465,513 | 8/1984 | Selines et al. ........... 75/53 |
| 4,490,173 | 12/1984 | Schwer .................. 75/306 |
| 4,528,035 | 7/1985 | Simpson, Jr. et al. ..... 75/257 |
| 4,531,972 | 7/1985 | Gueussier et al. ........ 75/58 |
| 4,541,867 | 9/1985 | Neelameggham et al. .... 75/58 |
| 4,570,692 | 2/1986 | Wilson .................. 164/56.1 |
| 4,572,747 | 2/1986 | Sussman et al. .......... 148/3 |
| 4,586,956 | 5/1986 | Labate .................. 75/58 |
| 4,589,915 | 5/1986 | Gorgerino ............... 75/53 |
| 4,601,751 | 7/1986 | Brandenberger et al. ... 75/130 R |
| 4,612,046 | 9/1986 | Orcutt .................. 75/303 |
| 4,624,707 | 11/1986 | Cramb et al. ............ 75/257 |
| 4,643,766 | 2/1987 | Kieger .................. 75/51.4 |
| 4,652,308 | 3/1987 | Nakashima et al. ........ 75/49 |
| 4,670,049 | 6/1987 | Kelmar .................. 75/41 |
| 4,695,318 | 9/1987 | Knauss, Jr. et al. ...... 75/51.1 |
| 4,705,561 | 11/1987 | Green ................... 75/58 |
| 4,708,737 | 11/1987 | Skach, Jr. et al. ....... 75/58 |
| 4,738,719 | 4/1988 | McLean et al. ........... 75/257 |
| 4,769,066 | 9/1988 | Eiden ................... 75/10.67 |
| 4,786,320 | 11/1988 | Hobson et al. ........... 75/10.65 |
| 4,801,328 | 1/1989 | Canfiled ................ 75/58 |
| 4,814,004 | 3/1989 | Kaiura et al. ........... 75/24 |
| 4,814,005 | 3/1989 | Thompson ................ 75/24 |
| 4,842,642 | 6/1989 | Bowman .................. 75/10.58 |
| 4,849,165 | 7/1989 | Schaefer ................ 420/23 |
| 4,880,463 | 11/1989 | Saad .................... 75/257 |
| 4,943,411 | 7/1990 | Henych et al. ........... 423/566 |
| 4,956,009 | 9/1990 | Robison, Jr. ............ 75/307 |
| 5,002,733 | 3/1991 | Breton et al. ........... 420/578 |
| 5,007,958 | 4/1991 | Chung et al. ............ 75/330 |
| 5,028,257 * | 7/1991 | Tomkins et al. .......... 75/305 |
| 5,085,691 | 2/1992 | Nakonechny et al. ....... 75/546 |
| 5,106,411 | 4/1992 | Miki et al. ............. 75/10.14 |
| 5,106,412 | 4/1992 | Bogan et al. ............ 75/570 |
| 5,179,997 | 1/1993 | Koul et al. ............. 164/473 |
| 5,201,941 | 4/1993 | Wells ................... 75/414 |
| 5,203,909 | 4/1993 | Petrushka et al. ........ 75/375 |
| 5,240,492 * | 8/1993 | Phillips et al. ......... 75/305 |
| 5,332,416 | 7/1994 | Calos ................... 75/414 |
| 5,332,418 | 7/1994 | Daussan et al. .......... 75/303 |
| 5,366,535 * | 11/1994 | Heaslip et al. .......... 75/305 |
| 5,375,816 | 12/1994 | Ryan et al. ............. 266/44 |
| 5,385,601 | 1/1995 | Kemeny et al. ........... 75/748 |
| 5,397,379 * | 3/1995 | Barker et al. ........... 75/319 |
| 5,429,655 | 7/1995 | Ogura et al. ............ 75/10.61 |
| 5,544,695 * | 8/1996 | Harasym ................. 164/437 |

* cited by examiner

BASIC TUNDISH FLUX COMPOSITION FOR STEELMAKING PROCESSES

This application is a division of application Ser. No. 08/763,359, filed Dec. 11, 1996.

BACKGROUND OF THE INVENTION

The invention relates to flux compositions for protecting and further refining molten steel in a tundish. The tundish fluxes are particularly useful during the transfer of steel from the tundish to the caster mold in a continuous casting process. However, the compositions can be used in any steelmaking process requiring a tundish.

Historically, steel production utilized blast furnace iron and a scrap charge in a Basic Oxygen Furnace (BOF) or scrap melting in an electric arc furnace to produce ingots of cast steel for reheating and rolling into manufacturing stock. Increasingly demanding applications have led to the development of more stringent physical and chemical specifications for the final steel products.

The ladle metallurgy furnace (LMF) is an additional steel refining step that has become a widely used tool to ensure consistent conformance to the rigid steelmaking requirements set by continuous casters. This additional refining step employs a ladle slag to lower the level of elements, such as sulfur and phosphorous, maintain or lower the oxygen level, and decrease the content of non-metallic inclusions, such as alumina and various sulfide and oxide species. The ladle slag composition is designed for the different grades of steel being produced, with the majority requiring desulfurization. A ladle slag is best utilized for refining when it is a fluid and vigorously mixed with the steel through dynamic physical particle interaction. Thus, it is advantageous for the ladle slag to become as fluid as possible immediately upon tapping the metal from the furnace into the ladle. The full body of the separate slag and metal masses may then enter the slag/metal reaction interface where chemical refining is most rapid. Fluidity and slag/metal mixing in the ladle therefore effectively increases the interfacial area of the slag to accelerate the refining reactions. Rapid and efficient chemical refining of steel in the ladle also requires large quantities of lime in solution within the slag to provide the high basicity needed for maximum sulfur and phosphorus transfer between the steel and the slag. The reaction at the slag/metal interface between calcium oxide in the slag and dissolved sulfur in the molten steel produces calcium sulfide that remains stable within the top slag layer as long as a reducing chemistry is maintained.

Following the refining step in the LMF, the molten steel is poured from the ladle into a tundish from which the molten steel passes to the continuous casting mold. The tundish is required as an intermediary between the ladle and the caster mold to act as a reservoir and thus facilitate the continuous supply of steel to the caster. In order to protect the molten steel from deleterious changes to chemical and thermal profiles during the residence time in the tundish, it is known to apply a layer of powder to the surface of the molten steel in the tundish. The applied powder melts upon its addition to the tundish due to heat transfer from the steel, thus creating a liquid slag layer at the molten steel interface. This tundish slag layer not only protects the liquid steel from atmospheric oxidation, but further facilitates any additional or final refining of the steel prior to solidification during casting. The tundish slag layer also serves to absorb any ladle slag carryover from the ladle being tapped into the tundish. In contrast to the mixing of the slag with the molten steel in the ladle, the tundish slag remains as a surface layer.

The tundish slag (flux) is required to have the following functions and properties:

1) To easily form a continuous surface layer on the liquid steel to provide complete atmospheric protection and thus prevent reoxidation of metals in the steel and its alloys.
2) To provide thermal insulation to prevent the molten steel from losing heat.
3) To melt quickly at the molten steel interface to allow immediate absorption of nonmetallic inclusions, such as alumina, silica or magnesia, which may be present in the liquid steel.
b 4) To remain liquid at the metal interface, even after considerable alumina has been absorbed, so as to continue to function as a continuous layer for thermal insulation and inclusion absorption.
5) To be restricted in content of highly corrosive fluxing elements (such as fluorine, lithium, sodium, potassium, titanium and boron) to prevent or minimize refractory erosion within the tundish.
6) To contain a small amount of magnesia to retard the rate and extent of the refractory erosion in the lining of the tundish and the flow control devices contained within.
7) To contain low levels of easily reducible oxides, such as FeO and MnO, to avoid reoxidation of the steel and its alloys.
8) To be restricted in the level of silica contained within the mix to prevent or minimize the pickup of silicon by the steel in grades of steel that are silicon restricted.
9) To have some desulfurizing capability in order to allow for the cleanest and highest quality steels to be cast into final products with the most desirable mechanical properties.
10) To be cost effective for application to the widest range of steel grades for maximum benefit to steelmakers of both lower quality (e.g. rebar) and high quality (e.q. critical exposed) steels.

To facilitate the spreading of the flux over the entire surface of the steel in the tundish, several approaches have been described. Materials which contain a certain L.O.I. (Loss On Ignition) have been incorporated into final flux product blends in order to provide a gas layer that is generated at the interface between the steel and the tundish flux layer. This gas layer acts as a low friction surface for increased material flowability to quickly and easily spread the applied powder to the furthest reaches of the tundish. Such L.O.I. materials include calcium carbonate, magnesium carbonate, sodium carbonate, wood flour, powdered coke, graphite, and unburned ricehulls. Typically, these materials are used in percentages sufficient to yield a final product L.O.I. of between 4 and 10%.

For rapid melting when the flux material contacts the surface of the molten steel, low melting point fluidizing materials, such as dense soda ash and/or glass cullet, nepheline, potash, lithia and lithium carbonate, may be incorporated into the tundish flux mixture. Other materials used as fluidizers in tundish flux powders include potassium carbonate, sodium carbonate, wollastonite, feldspar, cryolite, borax, fluorspar, sodium silicate, portland cement, calcium aluminate, lithium titanate, phosphorus furnace slag and blast furnace slag. Many of these compounds are considered to have the ability to keep the flux layer fluid at the steel interface even after a considerable portion of alumina has been absorbed. However, as discussed below, many of these materials, such as fluorspar, calcium aluminate, phosphorus furnace slag and blast furnace slag, have disadvantages for use in a tundish flux mixture that outweigh their possible usefulness as fluidizing agents.

For thermal insulation of the steel surface in the tundish, burned ricehulls are often employed. Ricehulls, which typically contain 95% silica and 5% carbon, are inexpensive compared to traditional basic tundish flux compositions and provide very good thermal insulation. However, burned ricehulls are solid at steel-casting temperatures and are not very effective for oxidation protection or inclusion absorption. In addition, they are chemically acidic in nature due to the high percentage of contained silica. They have been used, however, in conjunction with basic tundish fluxes in dual applications where the basic flux composition is applied directly to the surface of the steel and the acidic, insulating layer of ricehulls is added on top of the basic flux. Burned ricehulls, however, are undesirable for use with carbon-restricted grades of steel (e.g. ultra low carbon, stainless and silicon electrical steels) or silicon-restricted grades of steel due to the likelihood of carbon or silica pickup, respectively, by the steel.

It is also necessary to minimize the level of silica in tundish flux applications in order to produce cleaner steel, wherein total oxygen contents are a measure of the final cast steel quality. It is well known that, as a weaker oxide, silica can act as an oxygen pump and effectively provide oxygen to the steel in the tundish. This, in turn, causes oxidation of alloys in the steel, such as aluminum and calcium, producing nonmetallic inclusions which cause caster nozzle clogging and quality downgrades in the cast steel product. Additionally, silica, as a nonmetallic inclusion itself, can become trapped in the steel bath, again leading to nozzle clogging and quality downgrades. Finally, as an acidic oxide, silica acts to chemically erode the basic high magnesia lining and high alumina shapes within the tundish. This chemical incompatibility within the tundish itself is a major reason for the use of tundish powders that are chemically basic in nature, rather than acidic.

Other approaches to thermal insulation of the steel surface in the tundish include the use of phosphorus furnace slag, which has been proposed as both a ladle and a tundish flux. This material is described as having the ability to only partially melt at the steel interface, while the balance of the flux layer remains as a powder to provide thermal insulation to the steel surface. However, phosphorus slag contains undesirably high levels of both silica and phosphorus, which can transfer to the steel in the tundish.

Other thermal insulation materials include acid treated graphite, which expands when heated to approximately 20 times its original volume. This material acts to effectively increase the volume of the total flux layer and creates gas space within the powder layer to provide an effective insulating layer within the volume of the covering mixture. However, graphite cannot be used for carbon restricted grades of steel.

In order to use the tundish as more than just a steel reservoir for feeding the caster, several different tundish flux formulations have been proposed to provide some measure of desulfurization to the steel as it passes through the tundish, thus using the tundish as a chemical refining vessel as well. These proposed formulations are chemically basic (high CaO, low $SiO_2$, low FeO), have high amounts of strong fluxing materials (20–40% $CaF_2$ and 10–70% BaO) to ensure that the lime contents are fluidized, and have 0–5% metalloids (Al, Ca or Mg) to ensure that low oxygen levels exist within the tundish flux layer. However, not only are such compositions expensive, but the high levels of fluorspar ($CaF_2$) are also corrosive to the refractory elements in the tundish and are chemically reactive with carbon and silicon, thereby producing significant quantities of environmentally and physically harmful carbon tetrafluoride and silicon tetrafluoride. The loss of fluorine to the atmosphere via these reactions also causes a loss of fluidity in the tundish slag layer.

Apart from calcium fluoride, other low melting point materials for fluidizing higher melting point lime compounds in slag mixtures are commonly used, such as mono, di or tricalcium aluminate, with dicalcium aluminate being most preferred. Dicalcium aluminate is traditionally considered one of the lower melting point compositions of calcium aluminate available, according to the lime-alumina binary diagram where a 50/50 weight ratio of lime and alumina ($12CaO.7Al_2O_3$ molar ratio) forms the eutectic point in the mix, with a melting point of approximately 2550° F. Such high alumina flux materials, and others containing 40–70% alumina are commonly available on the market and typically used for steelmaking. However, with the incorporation of 50–75% calcium aluminate into the mixture, $Al_2O_3$ levels in the final flux product are typically 25–50%. While this material is ideal for fluxing lime into solution within the electric furnace, the BOF, or the ladle, the alumina content is far too high to be used in a tundish slag mix, since the high alumina levels severely restrict the quantity of alumina inclusions that can be absorbed from the steel as it passes from the tundish to the mold.

There is a need, therefore, for a tundish flux composition that is inexpensive, yet overcomes the problems associated with prior tundish flux additives and meets all the requirements described above for providing a protective and refining cover for molten steel in a tundish.

SUMMARY OF THE INVENTION

The tundish flux composition of the invention employs solid recycled ladle metallurgy furnace (LMF) slag as a fluidizing and refining base ingredient in a chemically engineered tundish flux mixture. The designed mixture combines the recycled LMF slag and virgin raw materials in a powdered product for application to the surface of molten steel contained within the tundish. The recycled LMF slag provides a low melting point, fluidizing addition to chemically flux the raw materials within the mixture and to flux nonmetallic inclusions from the steel into the liquid slag layer at the slag/steel interface. The use of recycled LMF slag in the tundish flux composition achieves improved results over those achieved by using entirely virgin materials for the tundish flux and results in a tremendous cost advantage.

Selection of a recycled LMF slag that is suitable for use in a tundish application is based on an analysis of its chemical composition which must fall within the specified parameters described below. Advantageously, the recycled LMF slag has a low melting point (about or below 2400° F.), a high percentage of premelted lime for rapid fluidization of the virgin raw materials, a low alumina content which allows for maximum absorption of alumina from the liquid steel, the presence of low levels of premelted magnesia to provide instant refractory protection in a fluid form to the tundish upon addition and melting of the refining mixture, and low levels of iron oxide and manganese oxide. The high sulfur absorbing capacity of the LMF slag (theoretically up to 2% sulfur in solution) makes it ideal for the desulfurization application in the ladle refining of steel. Thus, it is particularly surprising that a recycled LMF slag that has already functioned in a refining capacity and has acquired deleterious elements from the ladle steel refining process can still be used as an engineered component in a refining and desulfurizing mixture for a tundish application.

The preferred recycled LMF slag for use as an ingredient in the powdered tundish flux of the invention comprises about 35% to about 65% CaO; about 10% to about 35% $Al_2O_3$; about 1% to about 10% $SiO_2$; about 3% to about 15% MgO; about 0.3% to about 10% FeO; about 0.1% to about 5% MnO; about 0.01% to about 0.15% $P_2O_5$; and about 0.1% to about 0.5% S. Mixtures of raw materials, selected from the group consisting of a calcium oxide source, a fluorine source, a magnesium oxide source, a carbon source, a silica source, a sodium source and a potassium source are added to the recycled LMF slag component to form a powdered tundish flux comprising about 10% to about 80% of the recycled LMF flux and about 20% to about 90% of the raw materials.

The final tundish flux composition for use in the tundish comprises about 30% to about 60% CaO, about 5% to about 25% $Al_2O_3$, about 10% to about 40% $SiO_2$, about 5% to about 25% MgO, 0% to about 10% $CaF_2$, 0% to about 10% of a mixture of $Na_2O$ and $K_2O$, 0% to about 5% carbon, and 0% to about 2% FeO, where the $CaF_2$, $Na_2O$, $K_2O$ and FeO are not all zero at the same time. In another embodiment, the composition comprises about 40% to about 60% CaO, about 8% to about 15% $Al_2O_3$, about 10% to about 30% $SiO_2$, about 7% to about 20% MgO, 0% to about 5% $CaF_2$, 0% to about 8% of a mixture of $Na_2O$ and $K_2O$, 0% to about 3% carbon, and 0% to about 2% FeO, where the $CaF_2$, $Na_2O$, $K_2O$ and FeO are not all zero at the same time. In still another embodiment, the composition comprises about 45% to about 55% CaO, about 10% to about 14% $Al_2O_3$, about 15% to about 25% $SiO_2$, about 8% to about 15% MgO, 0% to about 3% $CaF_2$, 0% to about 6% of a mixture of $Na_2O$ and $K_2O$, 0% to about 2% carbon, and 0% to about 2% FeO, where the $CaF_2$, $Na_2O$, $K_2O$ and FeO are not all zero at the same time. In still another embodiment, the composition comprises about 48% to about 53% CaO, about 11% to about 13% $Al_2O_3$, about 18% to about 22% $SiO_2$, about 9% to about 13% MgO, from 0% to about 2% $CaF_2$, 0% to about 4% of a mixture of $Na_2O$ and $K_2O$, 0% to about 2% carbon, and 0% to about 2% FeO, where the $CaF_2$, $Na_2O$, $K_2O$ and FeO are not all zero at the same time.

DETAILED DESCRIPTION OF THE INVENTION

Commonly owned U.S. Pat. No. 5,397,379, the disclosure of which is hereby incorporated by reference, teaches the economical use of recycled LMF slag as a very effective fluidizer when added to the virgin materials most commonly used in synthetic ladle slag compositions. It has been herein discovered that recycled LMF slag is also very effective and economical as a base ingredient in a tundish flux composition. By incorporating the recycled LMF slag with other raw materials according to a specified chemical composition, a powdered tundish flux composition is achieved that meets all of the aforementioned requirements of a tundish slag mixture.

The preferred recycled LMF slag, before mixing with raw materials to form the tundish flux mixture, has the chemical composition illustrated in Table 1. Recycled LMF slag is preferred over recycled blast furnace slag or phosphorus slag because it has lower levels of undesirable residual elements and compounds. For example, blast furnace slag contains much higher levels of sulfur, phosphorus and FeO, and phosphorus slag contains much higher levels of silica and phosphorus. High FeO levels are an undesirable source of oxygen within the tundish flux mixture and prevent proper desulfurization and inclusion absorption. High silica levels are undesirable for the reasons presented above. High sulfur and phosphorus levels are also undesirable due to the possible and likely reversion of these elements from the basic tundish flux slag layer to the molten steel. Even when high proportions of recycled LMF slag are used in the tundish flux mixture, the resulting formulations contain comparatively less weight in sulfur, phosphorus, silicon and oxygen (from iron oxide) than if other recycled slag sources were employed.

The low melting point and low alumina content of the recycled LMF slag used in the flux of the invention also provides a rapidly fluidized tundish slag layer with an enhanced capability to immediately absorb alumina inclusions from the steel. The low melting point of the recyclable LMF slag results from the presence of relatively small amounts of oxides, such as silica, magnesia, iron oxide and manganese oxide, which effectively produce a melting point that is lower than that of commonly available calcium aluminate-based compounds. Moreover, because of the low alumina content of the recyclable LMF slag, larger quantities of this desirable fluidizing material can be incorporated into the tundish flux mixture than is possible with commercially available calcium aluminate fluidizers. As the commercially available types of calcium aluminate are typically 40–70% alumina, the incorporation of this raw material in any significant amount will raise the final alumina level in the tundish flux product to undesirable high levels (greater than 25%), resulting in a decrease in the useful life of the tundish slag covering upon absorption of alumina from the steel.

It is especially important to accurately source and confirm the complete chemistry of an LMF slag material before recycling it as a tundish flux ingredient. It is not any LMF slag which can be used, but only an LMF slag with a chemistry that meets the rigid requirements of the tundish flux application.

It has been found that, due to its high sulfur capacity, LMF slag can possibly contain relatively high amounts of sulfur, close to the theoretical saturation level of 2% sulfur in solution. Thus, LMF slags that have been used for ladle desulfurization of high sulfur containing steels would not be suitable for recycling in a tundish flux. For example, steel produced in an electric furnace from high sulfur-containing scrap or steel produced in a BOF from insufficiently desulfurized blast furnace iron would both require extensive desulfurization in the ladle, resulting in ladle slag more heavily loaded with sulfur. Thus, only LMF slags used to desulfurize low sulfur steels would have an acceptable sulfur content within the specified range. LMF slags with sulfur levels in the lowest part of the range are preferred. Ideally, the LMF slag for recycling can be obtained from integrated steel mills that perform the majority of steel desulfurizing in the hot metal from the blast furnace. Additionally, the majority of the scrap used within the BOF to supplement the charge of desulfurized hot metal must also be low in sulfur. This is because the steel produced during the oxygen-decarburization stage of steelmaking within the BOF essentially is tapped or poured from the furnace with the same amount of sulfur contained within the molten steel product as the total of the sulfur units charged into the furnace from the hot metal, steel scrap, and any materials, such as coke or coal, injected into the BOF. As the steelmaking process within the BOF is an oxidation process, desulfurization of the steel does not occur within the steelmaking vessel, but must be performed in the ladle in separate refining (desulfurizing) steps. If steel tapped from the BOF contains lower levels of sulfur, such as 0.010% to 0.015% sulfur, then less sulfur removal is required during ladle refining. The LMF slag that is the result of this ladle refining process is consequently lower in sulfur and is more applicable for recycling and reuse in a tundish flux application. Thus, the complete understanding of the chemical nature and source of the recyclable LMF slag makes it theoretically and practically possible to accurately locate and recycle this material.

The tundish flux composition is produced by mixing recycled LMF slag of acceptable chemistry with a raw material selected from a calcium oxide source, a fluorine source, a magnesium oxide source, a carbon source, a silica source, a sodium source, a potassium source, and mixtures of these. The flux composition comprises about 10% to about 80% recycled LMF slag and about 20% to about 90% of the raw material. Preferably, the flux composition comprises about 20% to about 60%, especially about 30% to about 50%, recycled LMF slag material.

Embodiments of preferred tundish flux compositions employing recycled LMF slag are illustrated in Table 2. The calcium oxide source is selected from calcium oxide, lime, limestone, dolomite, dolomitic lime, and mixtures of these. The fluorine source is selected from calcium fluoride, sodium fluoride, potassium fluoride, cryolite, sodium aluminum fluoride, and potassium aluminum fluoride, and mixtures of these. The magnesium oxide source is selected from dolomite, dolomitic lime, and mixtures of these. The carbon source is selected from acid treated graphite, graphite, powdered coke, anthracite, bituminous coal, wood flour, gilsonite, and mixtures of these. The silica source is selected from burned ricehulls, unburned ricehulls, high silica sand, quartz, and mixtures of these. The sodium source is selected from soda ash, sodium fluoride, sodium aluminum fluoride, nepheline syenite, and mixtures of these. The potassium source is selected from potassium fluoride, potash, nepheline syenite, potassium aluminum fluoride, and mixtures of these.

The recycled LMF slag and raw materials that are used to produce the overall chemistry illustrated by the embodiments of Table 2 are chosen specifically to exhibit desirable behaviors when added in a blend to the surface of the molten steel in the tundish. At least 10%, but not more than 80%, of the overall mixture should be comprised of materials that have a lower melting point than the steel temperature in the tundish. As this temperature range is typically 2700° F. to 2850° F., low melting point materials, such as the recycled LMF slag, nepheline syenite and calcium fluoride should be used in proportions that produce a tundish flux with the specified chemical makeup, but in total quantities that meet the low melting point criteria. The recycled LMF slag contains iron oxide, and materials such as nepheline syenite provide calcium fluoride, and sodium and potassium oxides. According to the embodiments, the added quantities of $CaF_2$, $Na_2O$, $K_2O$ and FeO can vary and can be zero. However, in order to provide the low melting point ingredients, they cannot all be zero at the same time.

In a preferred embodiment, the tundish flux composition comprises a mixture of recycled LMF slag, high calcium lime, dolomitic lime, nepheline syenite and high silica sand. In particular, a more preferred embodiment of the composition comprises 20% recycled ladle metallurgy furnace slag, 20% nepheline syenite, 35% high calcium lime, 16% dolomitic lime, 7% silica sand and 2% calcium fluoride.

The tundish flux composition is typically prepared with recycled LMF slag that has a variable particle size of ⅜ inches or smaller, resulting in a final composition for application to the tundish that also has a variable particle size of ⅜ inches or smaller.

When applied to the surface of molten steel in a tundish, the tundish flux mixture of the invention meets all of the requirements set forth above for an ideal tundish flux. The flux mixture quickly and freely spreads over the entire surface area of the steel in the tundish to quickly establish atmospheric protection of the steel. This property is provided by the recycled LMF slag material that exhibits an L.O.I. which is small (0.5–5%) yet effectively generates a gas layer at the interface between the steel and the tundish flux layer upon which the solids may flow. For certain applications in which carbon contamination is not a concern, the flowability of the mixture can be enhanced by adding carbonates and other carbon sources to the mixture. Unburned ricehulls may be added with the tundish flux to provide volatiles, such as hydrocarbons, which also generate a gas layer at the steel/flux interface.

The mixture of the invention quickly melts at the steel/flux interface so that the benefits of nonmetallic inclusion absorption are immediately provided to the steel flowing through the tundish. This is a very important property in any tundish flux design as the residence time of steel in the tundish varies depending on the speed of the caster, the width and depth of the steel shape being cast, and the internal flow properties of the given tundish design. A low residence time means that the time to absorb any nonmetallic inclusions that may be present in the molten steel may be exceedingly short, especially upon caster startup when the tundish flux is first applied. Thus, the speed with which the tundish flux melts may strongly influence the quality of the steel produced during the first stages of caster operation. It can also directly affect the flow of steel to the caster mold because nonmetallic inclusions not absorbed by the tundish covering can become adhered to the casting nozzle of the tundish. The presence of such accretions can seriously affect the speed at which the caster can operate and can restrict the flow of metal to the caster mold to such an extent that the caster will shut down.

The low melting point of the recycled LMF slag (about 2400° F.) in the tundish powder of the present invention provides a liquid base, which forms immediately upon addition to the molten steel due to the transfer of energy from the steel to the tundish powder. As the temperature of the steel in the tundish is typically 2700° F. to 2850° F., especially when refining higher quality grades of steel (e.q. low carbon, aluminum killed critically exposed automotive application steels), the difference in temperature between the molten steel and the melting point of the recycled LMF slag provides an ideal environment to facilitate the rapid melting of this component of the tundish flux powder mixture. Additional low melting point materials, described above, may also be ingredients in the flux mixture.

The ability to remain liquid next to the steel surface is a required property of the tundish flux that is also provided by the recycled LMF slag component. Unlike traditional compositions formulations employing calcium aluminate that typically have initial alumina levels of up to 70%, the use of recycled LMF slag allows for initial $Al_2O_3$ levels in the final powdered tundish flux composition of below 25%, and preferably not greater than 20%. Thus, when the powder melts on the surface of the steel in the tundish, it is able to absorb more alumina from the steel before becoming "crusted over" due to raising of the melting point of the resulting slag as the alumina content increases. The usefulness of the composition of the invention as an inclusion absorber is therefore enhanced by the recycled LMF slag component, without resorting to the use of large amounts of the expensive calcium aluminate components traditionally used to perform this function.

The provision of thermal insulation to the steel by the tundish flux is accomplished by the addition of acid treated graphite to the flux mixture in applications where carbon pickup by the steel is not a concern. As discussed above, the volumetric expansion of this raw material upon heating allows some of the applied powder mixture to remain as a powder on top of the liquid flux layer next to the molten steel surface. As more alumina is absorbed by the molten layer of the tundish flux, the upper powder layer descends toward the steel surface, where it then melts and dilutes the alumina in the lower inclusion-absorbing layer facilitating continued alumina absorption. As the flux material absorbs alumina and the powder layer begins to melt and descend toward the molten steel surface, additional material is again added to maintain a layer of powder for thermal insulating purposes.

For those grades of steel where carbon pickup is a concern, thermal insulation may be attained with ceramic fibers that are of a high enough melting point to retard the melting of the portion of the tundish flux layer furthest from the molten steel. Diatomaceous earth may also be used in place of graphite or ceramic fibers in quantities that provide thermal insulation but remain within the chemical confines of the composition of the tundish flux of the invention. Still another approach, which does not employ graphite, ceramic fiber or diatomaceous earth, is to provide a sufficient quantity of the tundish flux of the invention on the surface of the steel in the tundish to create a depth of flux material such that the melting point of the mixture furthest away from the steel/slag interface is not reached due to the depth of the flux material itself.

Burned ricehulls may also be employed as an insulating and atmospheric protection layer. Typically, 1.0 to 1.5 pounds of burned ricehulls are added per ton of steel. When used in conjunction with the tundish flux of the present invention, up to 0.5 pounds of burned ricehulls per ton of steel may be added, depending on the grade of steel cast, the chemistry of the tundish flux mixture, and the amount of steel to be cast through the single tundish.

Refractory protection to the magnesia lining and shapes contained within the tundish is also provided by the tundish flux composition of the invention. Traditional basic tundish flux designs have incorporated individual raw materials containing high percentages of magnesia to the overall blend applied to the tundish. As pure magnesia has an extremely high melting point (approximately 5000° F.), it takes some time for this component of the mixture to become incorporated into the liquid chemistry of the resulting liquid tundish slag layer. The incorporation of the recycled LMF slag into the tundish flux design of the present invention provides an instant measure of highly desired magnesia in the liquid layer, which forms rapidly upon application of the powder to the steel in the tundish. This is because premelted magnesia exists in the recycled LMF slag in a readily available form. Because of the presence of this premelted magnesia in the LMF slag, there is a reduced requirement for higher melting point magnesia-containing raw materials to achieve the required MgO concentration in the tundish flux composition.

The tundish flux composition of the invention contains low levels of FeO and MnO to minimize the oxidation of the steel and its alloys flowing through the tundish. The recycled LMF slag provides 0% to 5% FeO, typically 1% to 4%. A flux mixture that contains less than 50% by weight of LMF slag contains less than 2.0% FeO by weight. This mixture compares favorably with previous tundish flux designs which also limit the overall composition to less than 1.5% FeO by weight.

The tundish flux composition of the invention is restricted in the use of strongly fluxing elements, such as fluorine, boron, lithium, titania, sodium and potassium, to reduce refractory wear in the tundish. The use of the invention flux composition is therefore more cost effective overall than other product designs that include much greater amounts of these fluxing elements. By reducing the cost of the tundish flux, it can be more widely used for production of less expensive and lower quality grades of steel that presently cannot economically justify the use of higher priced tundish fluxes.

The tundish flux composition of the invention provides a measure of desulfurizing capability to the fluid slag layer at the molten steel interface. This capability is provided by the careful selection of the raw materials used to fulfill the chemical specifications of the tundish flux design, and by blending them into a final composition that is low in FeO, low in silica, high in lime, and can melt at temperatures that can be generated through contact with the molten steel. As discussed previously, it is knowledge of the sulfur capacity of the original LMF slag and the extent to which it has been used to desulfurize steel prior to its original discard and subsequent collection for recycling that allows the LMF slag to be identified, obtained and used for this purpose. It is not any LMF slag that can be used, but only LMF slag with a chemistry that meets the rigid requirements of the tundish flux application.

The following example is illustrative of the function of a tundish flux composition of the invention in a continuous casting operation.

EXAMPLE

A tundish flux mixture was prepared from 20% recycled LMF slag, 20% nepheline syenite, 35% high calcium lime, 16% dolomitic lime, 7% silica sand and 2% calcium fluoride. The powdered tundish flux mixture was applied to a tundish in both the trough area (over the nozzles that direct the flow of steel from the tundish to the caster mold) and in the pour box (where the steel from the ladle is directed through an entry nozzle into the tundish). The trough area received a quantity of the powder that was three times greater than the quantity applied in the pour box. The total quantity of tundish flux added to the steel was approximately one pound of flux per ton of steel cast. In addition to the flux, approximately 0.17 pounds of burned ricehulls per ton of steel were applied in the area of the pour box. This addition was made to help ensure that a continuous covering of powder remained on the molten steel during the casting operation. It was anticipated that, if the tundish flux became too fluid in the area of the pour box, the turbulence caused within the pour box due to the introduction of steel into the tundish could cause the flux to be pushed away from the entry nozzle with the result that the molten steel could become exposed to the atmosphere in this area.

Chemical analyses (illustrated in Table 3) were performed on the ladle slag from the ladle being tapped into the tundish ("Ladle Slag" in Table 3), the final powdered tundish flux product ("Powdered Tundish Flux" in Table 3), and samples of the tundish flux slags taken from a tundish at five various times during a continuous casting operation ("Tun Slag 1 . . . 5" in Table 3). The results support the capacity of the tundish slag of the invention to absorb alumina from the molten steel in a tundish. The results also show a high absorption of titanium dioxide that was probably present in the steel in the tundish due to carryover of slag from the ladle, thus illustrating the capacity of the tundish slag of the invention to absorb carryover ladle slag.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

TABLE 1

Preferred Composition of Recycled LMF Slag
For Use In A Powdered Tundish Flux Mixture

| | |
|---|---|
| CaO: | 35–65% |
| $Al_2O_3$: | 10–35% |
| $SiO_2$: | 1–10% |
| MgO: | 3–15% |
| FeO: | 0.3–10% |
| MnO: | 0.1–5% |
| $P_2O_5$: | 0.01–0.15% |
| S: | 0.1–0.5% |

TABLE 2

Preferred Powdered Tundish Flux Compositions
Containing Recycled LMF Slag

| | |
|---|---|
| CaO: | 30–60% |
| $Al_2O_3$: | 5–25% |
| $SiO_2$: | 10–40% |
| MgO: | 5–25% |
| $CaF_2$: | 0–10% |
| $Na_2O + K_2O$: | 0–10% |
| C: | 0–5% |
| FeO | 0–2% |
| particularly: | |
| CaO: | 40–60% |
| $Al_2O_3$: | 8–15% |
| $SiO_2$: | 10–30% |
| MgO: | 7–20% |
| $CaF_2$: | 0–5% |
| $Na_2O + K_2O$: | 0–8% |
| C: | 0–3% |
| FeO: | 0–2% |
| particularly: | |
| CaO: | 45–55% |
| $Al_2O_3$: | 10–14% |
| $SiO_2$: | 15–25% |
| MgO: | 8–15% |
| $CaF_2$: | 0–3% |
| $Na_2O + K_2O$: | 0–6% |
| C: | 0–2% |
| FeO: | 0–2% |
| particularly: | |
| CaO: | 48–53% |
| $Al_2O_3$: | 11–13% |
| $SiO_2$: | 18–22% |
| MgO: | 9–13% |
| $CaF_2$: | 0–2% |
| $Na_2O + K_2O$: | 0–4% |
| C: | 0–2% |
| FeO: | 0–2% |

TABLE 3

Chemical Analysis Of The Tundish Slags
During An Exemplary Continuous Casting Operation

| Sample | MgO | $Al_2O_3$ | $SiO_2$ | CaO | MnO | FeO | $TiO_2$ | P |
|---|---|---|---|---|---|---|---|---|
| Ladle Slag | 7.8* | 18.9 | 16.0 | 52.0 | 0.2 | 0.4 | 0.3 | 0.01 |
| Powdered Tundish Flux | 8.6 | 5.7 | 18.3 | 54.8 | 0.3 | 1.2 | 0.1 | 0.01 |
| Tun Slag 1 | 8.6 | 16.0 | 21.6 | 52.1 | 0.3 | 0.8 | 0.4 | 0.01 |
| Tun Slag 2 | 10.1 | 14.0 | 26.0 | 46.2 | 0.3 | 0.9 | 0.3 | 0.03 |
| Tun Slag 3 | 7.4 | 13.0 | 36.1 | 34.6 | 0.9 | 1.1 | 0.4 | 0.02 |
| Tun Slag 4 | 9.9 | 17.3 | 22.2 | 45.6 | 0.7 | 0.6 | 0.4 | 0.01 |
| Tun Slag 5 | 10.4 | 17.7 | 23.2 | 44.0 | 0.7 | 1.3 | 0.4 | 0.01 |

*All numbers percent by weight.

I claim:

1. In a process of refining steel comprising the steps of disposing in a tundish a quantity of molten steel and adding a material that forms a molten protective tundish slag on the molten steel in the tundish, the improvement comprising:
adding as the tundish slag forming material a solid tundish flux composition comprising, by weight about 10% to about 80% of a solid recycled ladle metallurgy furnace slag and about 20% to about 90% of a raw material selected from the group consisting of a calcium oxide source, a fluorine source, a magnesium oxide source; a carbon source, a silica source, a sodium source, a potassium source, and mixtures thereof.

2. The process of claim 1, wherein the tundish flux composition comprises, by weight about 20% to about 60% of the solid recycled ladle metallurgy furnace slag and about 40% to about 80% of the raw material.

3. The process of claim 2, wherein the tundish flux composition comprises, by weight about 30% to about 50% of the solid recycled ladle metallurgy furnace slag and about 50% to about 70% of the raw material.

4. The process of claim 1, wherein the recycled ladle metallurgy furnace slag comprises, by weight about 35% to about 65% CaO, about 10% to about 35% $Al_2O_3$, about 1% to about 10% $SiO_2$, about 3% to about 15% MgO, about 0.3% to about 10% FeO, about 0.1% to about 5% MnO, about 0.01% to about 0.15% $P_2O_5$, and about 0.1% to about 0.5% S.

5. The process of claim 1, wherein the calcium oxide source is selected from the group consisting of calcium oxide, lime, limestone, dolomite, dolomitic lime, and mixtures thereof.

6. The process of claim 1, wherein the fluorine source is selected from the group consisting of calcium fluoride, sodium fluoride, potassium fluoride, cryolite, sodium aluminum fluoride, and potassium aluminum fluoride, and mixtures thereof.

7. The process of claim 1, wherein the magnesium oxide source is selected from the group consisting of dolomite, dolomitic lime, and mixtures thereof.

8. The process of claim 1, wherein the carbon source is selected from the group consisting of acid treated graphite, graphite, powdered coke, anthracite, bituminous coal, wood flour, gilsonite, and mixtures thereof.

9. The process of claim 1, wherein the silica source is selected from a group consisting of burned ricehulls, unburned ricehulls, high silica sand, quartz, and mixtures thereof.

10. The process of claim 1, wherein the sodium source is selected from the group consisting of soda ash, sodium fluoride, sodium aluminum fluoride, nepheline syenite, and mixtures thereof.

11. The process of claim 1, wherein the potassium source is selected from the group consisting of potassium fluoride, potash, nepheline syenite, potassium aluminum fluoride, and mixtures thereof.

12. The process of claim 1, wherein the tundish slag forming material comprises, by weight about 30% to about 60% CaO, about 5% to about 25% $Al_2O_3$, about 10% to about 40% $SiO_2$, about 5% to about 25% MgO, 0% to about 10% $CaF_2$, 0% to about 10% of a mixture of $Na_2O$ and $K_2O$, 0% to about 5% carbon, and 0% to about 2% FeO, wherein the $CaF_2$, $Na_2O$, $K_2O$ and FeO are not all 0% at the same time.

13. The process of claim 12, wherein the tundish slag forming material comprises, by weight about 40% to about 60% CaO, about 8% to about 15% $Al_2O_3$, about 10% to about 30% $SiO_2$, about 7% to about 20% MgO, 0% to about 5% $CaF_2$, 0% to about 8% of a mixture of $Na_2O$ and $K_2O$, 0% to about 3% carbon, and 0% to about 2% FeO, wherein the $CaF_2$, $Na_2O$, $K_2O$ and FeO are not all 0% at the same time.

14. The process of claim 12, wherein the tundish slag forming material comprises, by weight about 45% to about 55% CaO, about 10% to about 14% $Al_2O_3$, about 15% to about 25% $SiO_2$, about 8% to about 15% MgO, 0% to about 3% $CaF_2$, 0% to about 6% of a mixture of $Na_2O$ and $K_2O$, 0% to about 2% carbon, and 0% to about 2% FeO, wherein the $CaF_2$, $Na_2O$, $K_2O$ and FeO are not all 0% at the same time.

15. The process of claim 12, wherein the tundish slag forming material comprises, by weight about 48% to about 53% CaO, about 11% to about 13% $Al_2O_3$, about 18% to about 22% $SiO_2$, about 9% to about 13% MgO, 0% to about 2% $CaF_2$, 0% to about 4% of a mixture of $Na_2O$ and $K_2O$, 0% to about 2% carbon, and 0% to about 2% FeO, wherein the $CaF_2$, $Na_2O$, $K_2O$ and FeO are not all 0% at the same time.

16. The process of claim 12, wherein the tundish flux composition comprises, by weight about 20% recycled ladle metallurgy furnace slag and about 80% of raw materials selected from the group consisting of nepheline syenite, high calcium lime, dolomitic lime, silica sand and calcium fluoride.

17. The process of claim 16, wherein the tundish flux composition comprises, by weight about 20% recycled ladle metallurgy furnace slag, about 20% nepheline syenite, about 35% high calcium lime, about 16% dolomitic lime, about 7% silica sand and about 2% calcium fluoride.

* * * * *